(12) United States Patent
Aikawa et al.

(10) Patent No.: US 11,180,000 B2
(45) Date of Patent: Nov. 23, 2021

(54) VEHICLE-MOUNTED TEMPERATURE CONTROLLER

(71) Applicant: TOYOTA JIDOSHA KABUSHIKI KAISHA, Toyota (JP)

(72) Inventors: Hidefumi Aikawa, Sunto-gun (JP); Manabu Orihashi, Okazaki (JP); Yoshio Hasegawa, Toyota (JP); Takashi Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 16/815,146

(22) Filed: Mar. 11, 2020

(65) Prior Publication Data

US 2020/0290431 A1 Sep. 17, 2020

(30) Foreign Application Priority Data

Mar. 13, 2019 (JP) .............................. JP2019-046204

(51) Int. Cl.
*B60H 1/32* (2006.01)
*B60H 1/00* (2006.01)

(52) U.S. Cl.
CPC ....... *B60H 1/3228* (2019.05); *B60H 1/00278* (2013.01); *B60H 1/00914* (2013.01); *B60H 2001/3255* (2013.01)

(58) Field of Classification Search
CPC ............ B60H 1/00278; B60H 1/00914; B60H 1/3228; B60H 2001/3255
See application file for complete search history.

(56) References Cited

U.S. PATENT DOCUMENTS

| 2009/0249807 | A1* | 10/2009 | Nemesh ............. B60H 1/00278 62/117 |
| 2017/0021698 | A1 | 1/2017 | Hatakeyama et al. |
| 2019/0263223 | A1 | 8/2019 | Durrani et al. |
| 2020/0047586 | A1* | 2/2020 | Gonze ................ B60H 1/00385 |
| 2020/0164719 | A1* | 5/2020 | Shiratori ............ B60H 1/00021 |
| 2020/0340758 | A1* | 10/2020 | Fuse ........................ F01P 11/20 |

FOREIGN PATENT DOCUMENTS

| JP | 2015-186989 A | 10/2015 |
| JP | 2019-147545 A | 9/2019 |

* cited by examiner

*Primary Examiner* — Marc E Norman
(74) *Attorney, Agent, or Firm* — Oblon, McClelland, Maier & Neustadt, L.L.P.

(57) ABSTRACT

A vehicle-mounted temperature controller includes a first heat circuit having a battery heat exchange part exchanging heat with a battery and a first heat exchange part, with a first heat medium circulating therethrough; and a refrigeration circuit having a compression part compressing a refrigerant, a second heat exchange part radiating heat from the refrigerant, an expansion part expanding the refrigerant, and the first heat exchange part evaporating the refrigerant by making the refrigerant absorb heat from the first heat medium, realizing a refrigeration cycle by the refrigerant circulating therethrough. The first heat circuit includes a bypass flow path bypassing the battery heat exchange part, and an adjusting device adjusting a flow rate of the first heat medium flowing through the bypass flow path based on the temperature of the battery.

4 Claims, 14 Drawing Sheets

VEHICLE-MOUNTED TEMPERATURE CONTROLLER

FIELD

The present disclosure relates to a vehicle-mounted temperature controller.

BACKGROUND

In the past, a vehicle-mounted temperature controller provided with a refrigeration circuit configured so as to realize a refrigeration cycle by circulation of a refrigerant and a low temperature circuit having a battery heat exchange part exchanging heat with a battery and configured so that cooling water circulates therethrough, has been proposed (for example, PTL 1). In such a vehicle-mounted temperature controller, the refrigeration circuit and the low temperature circuit share a single heat exchange part. This heat exchange part transfers heat from the cooling water of the low temperature circuit to the refrigerant, and causes the refrigerant of the refrigeration circuit to evaporate. As a result, due to this heat exchange part, the cooling water in the low temperature circuit is cooled and the battery is cooled through the battery heat exchange part by this cooled cooling water.

Further, in the vehicle-mounted temperature controller according to PTL 1, a condensing part for radiating heat to the outside and causing the refrigerant to condense, is provided in the refrigeration circuit. The heat radiated in this way is used for heating an inside of a passenger compartment of a vehicle mounting the vehicle-mounted temperature controller.

CITATIONS LIST

Patent Literature

[PTL 1] Japanese Unexamined Patent Publication No. 2015-186989

SUMMARY

Technical Problem

In this regard, in the vehicle-mounted temperature controller according to PTL 1, in order to heat the passenger compartment, it is necessary to make the refrigerant circulate through the inside of the refrigeration circuit. As a result, cooling water of the low temperature circuit is cooled. In addition, in the vehicle-mounted temperature controller according to PTL 1, the low temperature circuit is configured so that the circulating cooling water has to flow through the battery. For this reason, in this vehicle-mounted temperature controller, the battery is cooled when heating the passenger compartment.

However, in almost all batteries, if the temperature decreases to equal to or less than a certain temperature, the internal resistance increases and a drop in capacity or a drop in output voltage or other such drop in performance occurs. In the above-mentioned vehicle-mounted temperature controller, if the passenger compartment is continuously heated, the temperature of the battery decreases to equal to or less than the above certain temperature and a drop in performance ends up occurring.

In consideration of the above problem, an object of the present disclosure is to keep the performance of the battery from decreasing, in a vehicle-mounted temperature controller where the temperature of the heat medium of the low temperature circuit decreases if the passenger compartment is heated.

Solution to Problem

The present invention was made so as to solve the above problem and has as its gist the following.

(1) A vehicle-mounted temperature controller, comprising:
a first heat circuit having a battery heat exchange part exchanging heat with a battery and a first heat exchange part, and configured so that a first heat medium circulates therethrough; and
a refrigeration circuit having a compression part compressing a refrigerant to raise its temperature, a second heat exchange part radiating heat from the refrigerant to other than the refrigerant and the first heat medium to make the refrigerant condense, an expansion part making the refrigerant expand, and the first heat exchange part making the refrigerant absorb heat from the first heat medium to make the refrigerant evaporate, and configured to realize a refrigeration cycle by the refrigerant circulating therethrough,
wherein the first heat circuit comprises a bypass flow path bypassing the battery heat exchange part and an adjusting device adjusting a flow rate of the first heat medium flowing through the bypass flow path, and
the adjusting device is controlled so that a ratio of a flow rate of the first heat medium flowing through the bypass flow path becomes greater, when the temperature of the battery is relatively low, compared to when it is relatively high.

(2) The vehicle-mounted temperature controller according to above (1), wherein
the temperature controller further comprises a second heat circuit comprising a heater core heating an inside of a passenger compartment and configured so that a second heat medium circulates through the heater core, and
the second heat exchange part exchanges heat between the refrigerant and the second heat medium so as to transfer heat from the refrigerant to the second heat medium.

(3) The vehicle-mounted temperature controller according to above (1) or (2), wherein the adjusting device is configured to make all of the first heat medium flow through the bypass flow path when the temperature of the battery is equal to or less than a predetermined reference temperature, and to make the first heat medium flow through the battery heat exchange part when it is higher than the reference temperature.

(4) The vehicle-mounted temperature controller according to above (3), wherein the adjusting device is configured to make the first heat medium flow through the battery heat exchange part, if the temperature of the battery is lower than a lower limit temperature lower than the reference temperature, when the temperature of the battery is lower than the temperature of the first heat medium.

(5) The vehicle-mounted temperature controller according to above (3) or (4), wherein the adjusting device is configured to make the first heat medium flow through the bypass flow path, if the temperature of the battery is higher than the reference temperature, when the temperature of the battery is equal to or greater than the temperature of the first heat medium.

Advantageous Effects of Invention

According to the present disclosure, the performance of the battery is kept from decreasing in a vehicle-mounted temperature controller where the temperature of the heat medium of the low temperature circuit decreases if the passenger compartment is heated.

DESCRIPTION OF EMBODIMENTS

Figure 1:
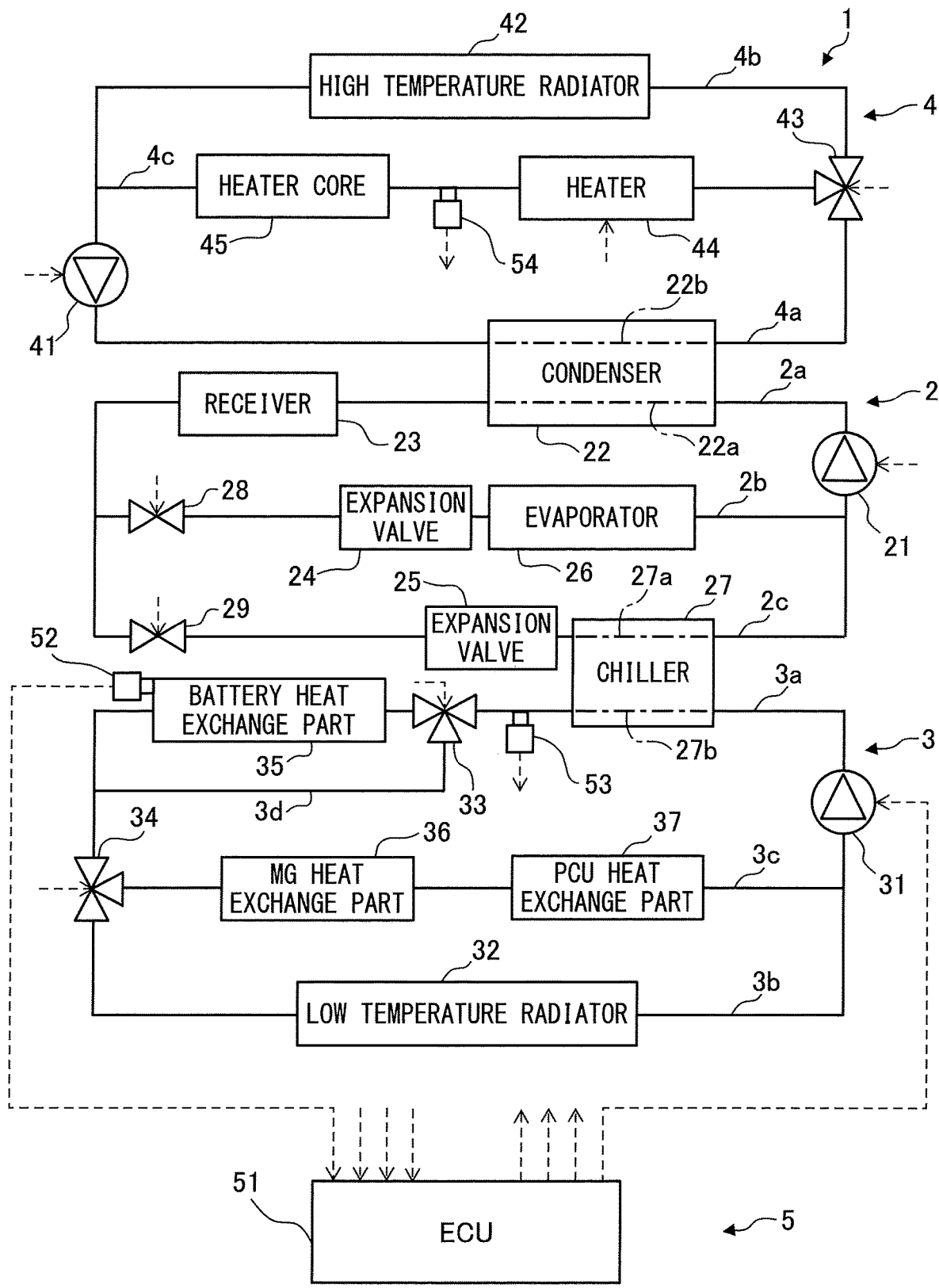
FIG. 1 is a view of the configuration schematically showing a vehicle-mounted temperature controller.

Below, referring to the drawings, embodiments will be explained in detail. Note that, in the following explanation, similar components are assigned the same reference signs.

First Embodiment

Configuration of Vehicle-Mounted Temperature Controller

Figure 2:
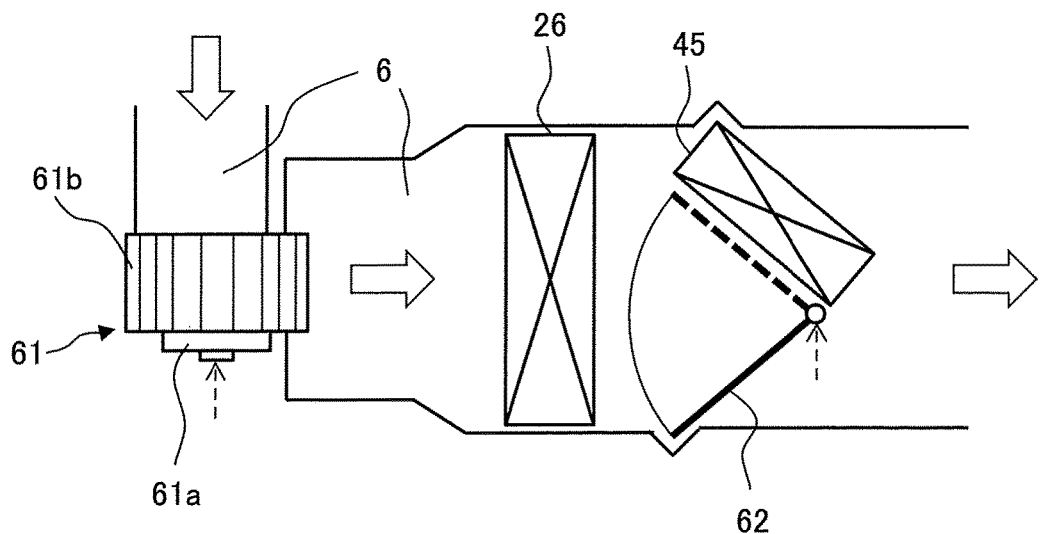
FIG. 2 is a view of the configuration schematically showing an air passage for air-conditioning a vehicle mounting the vehicle-mounted temperature controller.
Figure 3:
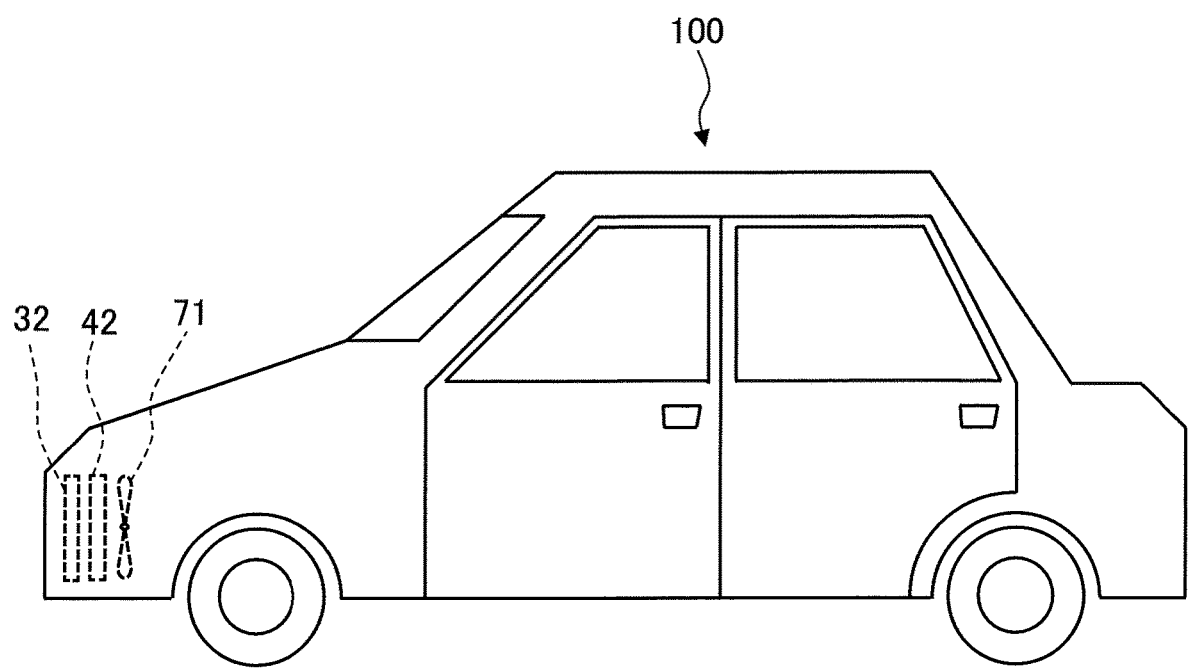
FIG. 3 is a view schematically showing the vehicle mounting the vehicle-mounted temperature controller.

Referring to FIGS. 1 to 3, the configuration of a vehicle-mounted temperature controller 1 according to a first embodiment will be explained. FIG. 1 is a view of the configuration schematically showing the vehicle-mounted temperature controller 1. In the present embodiment, the vehicle-mounted temperature controller 1 is particularly mounted in an electric vehicle driven by a motor.

The vehicle-mounted temperature controller 1 includes a refrigeration circuit 2, low temperature circuit (first heat circuit) 3, high temperature circuit (second heat circuit) 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the refrigerant piping 27a of the evaporator 26 are provided in that order in a direction of circulation of the refrigerant. In addition, at the chiller flow path 2c, the second solenoid regulating valve 29, the second expansion valve 25, and the chiller 27 are provided in that order.

At the refrigerant basic flow path 2a, the refrigerant flows regardless of the opening/closing of the first solenoid regulating valve 28 and the second solenoid regulating valve 29. If the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first solenoid regulating valve 28 is opened. If the refrigerant flows to the evaporator flow path 2b, the refrigerant flows through the first solenoid regulating valve 28, the first expansion valve 24, and the refrigerant piping 27a of the evaporator 26 in that order. The refrigerant flows to the chiller flow path 2c when the second solenoid regulating valve 29 is opened. If the refrigerant flows to the chiller flow path 2c, the refrigerant flows through the second solenoid regulating valve 29, the second expansion valve 25, and the chiller 27 in that orders.

The compressor 21 is one example of a compression part for compressing the refrigerant to raise it in temperature, and functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 is one example of a second heat exchange part for discharging heat from the refrigerant to something other than the refrigerant and cooling water of the later explained low temperature circuit 3 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 is one example of a condensing part for condensing the refrigerant, and functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquefied, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 is one example of a expanding part for making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expanding part, instead of the first expansion valve 24 and the second expansion valve 25.

The evaporator 26 is one example of evaporating part for causing the refrigerant to evaporate, and functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 is one example of a first heat exchange part for making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 is one example of evaporating part, for making the refrigerant evaporate, and functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, in the present embodiment, the solenoid regulating valve 28 is configured as a valve able to be adjusted in opening degree, but it may also be an on-off valve switched between an opened state and a closed state. Further, instead of the first solenoid regulating valve 28 and the second solenoid regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, some sort of valve may also be provided instead of these solenoid regulating valves 28 and 29.

Next, the low temperature circuit 3 will be explained. The low temperature circuit 3 includes a first pump 31, the cooling water piping 27b of the chiller 27, a low temperature radiator 32, first three-way valve 33, and second three-way valve 34. In addition, the low temperature circuit 3 includes the battery heat exchange part 35, MG heat exchange part 36, and PCU heat exchanging 37. In the low temperature circuit 3, the cooling water circulates through these components Note that, the cooling water is one example of the first heat medium. Inside the low temperature circuit 3, any other heat medium may be used instead of the cooling water.

The low temperature circuit 3 is divided into a low temperature basic flow path 3a, low temperature radiator flow path 3b, and high temperature equipment flow path 3c. The low temperature radiator flow path 3b and the high temperature equipment flow path 3c are provided parallel to each other and are respectively connected to the low temperature basic flow path 3a.

The low temperature basic flow path 3a is provided with, in a direction of circulation of cooling water, the first pump 31, the cooling water piping 27b of the chiller 27, and the battery heat exchange part 35 in that order. Further, at the low temperature basic flow path 3a, a bypass flow path 3d is connected so as to bypass the battery heat exchange part 35. In the present embodiment, the bypass flow path 3d is connected at one end between the chiller 27 and battery heat exchange part 35 in the direction of circulation of cooling water and is connected at the other end to the downstream side of the battery heat exchange part 35 in the above direction. At the connection part of the low temperature basic flow path 3a and the bypass flow path 3d, a first three-way valve is provided.

Further, the low temperature radiator flow path 3b is provided with the low temperature radiator 32. At the high temperature equipment flow path 3c, the MG heat exchange part 36 and PCU heat exchange part 37 are provided in that order in the direction of circulation of cooling water. The high temperature equipment flow path 3c may also be provided with a heat exchange part exchanging heat with high temperature equipment other than the MG or PCU. Between the low temperature basic flow path 3a and low temperature radiator flow path 3b and the high temperature equipment flow path 3c, a second three-way valve 34 is provided.

The first pump 31 pumps the cooling water circulating through the low temperature circuit 3. In the present embodiment, the first pump 31 is electrically driven water pumps, and is configured so as to be able to be changed in discharge capacities steplessly by adjustment of the electric power supplied to the first pump 31.

The low temperature radiator 32 is a heat exchanger exchanging heat with the cooling water circulating through the low temperature circuit 3 and the air outside of the vehicle 100 (outside air). The low temperature radiator 32 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 33 is configured so that the cooling water flowing out from the cooling water piping 27b of the chiller 27 flows selectively into the battery heat exchanger 36 or the bypass flow path 3e. In the low temperature basic flow path 3a, when the first three-way valve 33 is set at the battery heat exchange part 35 side, the cooling water flows through the first pump 31, the cooling water piping 27b of the chiller 27, and the battery heat exchange part 35 in that order of the components. On the other hand, when the first three-way valve 33 is set to the bypass flow path 3d side, the cooling water does not circulate through the battery heat exchange part 35, therefore flows through only the first pump 31 and the chiller 27.

The second three-way valve 34 is configured so that the refrigerant flowing out from the low temperature basic flow path 3a selectively flows between the low temperature radiator flow path 3b and the high temperature equipment flow path 3c. If the second three-way valve 34 is set to the low temperature radiator flow path 3b side, the cooling water flowing out from the low temperature basic flow path 3a flows through the low temperature radiator 32. On the other hand, if the second three-way valve 34 is set to the high temperature equipment flow path 3c side, the cooling water flowing out from the low temperature basic flow path 3a flows through these MG heat exchange part 36 and PCU heat exchange part 37 in the order of these components. In addition, if able to set the second three-way valve 34 so that the cooling water flows to both, part of the cooling water flowing out from the low temperature basic flow path 3a flows through the low temperature radiator 32, while the remainder flows through the MG heat exchange part 36 and PCU heat exchange part 37 in the order of these components.

Note that, if possible to suitably adjust the flow rate of the cooling water flowing to the battery heat exchange part 35 and bypass flow path 3d, an adjusting valve or on-off valve or other adjusting device may be used, instead of the first three-way valve 33. Similarly, if possible to suitably adjust the flow rate of the cooling water flowing into the low temperature radiator flow path 3b and high temperature equipment flow path 3c, an adjusting valve or on-off valve or other adjusting device may be used, instead of the second three-way valve 34.

The battery heat exchange part 35 is configured so as to exchange heat with the battery (not shown) of the vehicle 100. Specifically, the battery heat exchange part 35, for example, is provided with piping provided around the battery, and is configured so that heat is exchanged between the cooling water flowing through this piping and the battery.

The MG heat exchange part 36 is configured to exchange heat with the motor-generator (MG, not shown) of the vehicle 100. Specifically, the MG heat exchange part 36 is configured so as to exchange heat between oil and cooling water flowing around the MG. Further, the PCU heat exchange part 37 is configured to exchange heat with the power control unit (PCU, not shown) of the vehicle 100. Specifically, the PCU heat exchange part 37 is provided with piping provided around the PCU and is configured so that heat is exchanged between the cooling water flowing through this piping and the battery.

Next, the high temperature circuit 4 will be explained. The high temperature circuit 4 includes a second pump 41, the cooling water piping 22b of the condenser 22, a high temperature radiator 42, a third three-way valve 43, an electric heater 44, and a heater core 45. In the high temperature circuit 4 as well, the cooling water circulates through these components. Note that, this cooling water is one example of the second heat medium. Inside the high temperature circuit 4, any other heat medium may be used instead of the cooling water.

Further, the high temperature circuit 4 is divided into a high temperature basic flow path 4a, high temperature radiator flow path 4b, and heater flow path 4c. The high temperature radiator flow path 4b and the heater flow path 4c are provided parallel to each other, and are respectively connected to the high temperature basic flow path 4a.

At the high temperature basic flow path 4a, a second pump 41 and the cooling water piping 22b of the condenser 22 are provided in that order in the direction of circulation of the cooling water. At the high temperature radiator flow path 4b, a high temperature radiator 42 is provided. Further, at the heater flow path 4c, an electric heater 44 and heater core 45 are provided in that order in the direction of circulation of the cooling water. A third three-way valve 43 is provided between the high temperature basic flow path 4a, and high temperature radiator flow path 4b and the heater flow path 4c.

The second pump 41 pumps the cooling water circulated through the high temperature circuit 4. In the present embodiment, the second pump 41 is an electric type water pump similar to the first pump 31. Further, the high temperature radiator 42, in the same way as the low temperature radiator 32, is a heat exchanger exchanging heat between the cooling water circulating through the high temperature circuit 4 and the outside air.

The third three-way valve 43 is configured so that the cooling water flowing out from the cooling water piping 22b of the condenser 22 selectively flows into the high temperature radiator flow path 4b or the heater flow path 4c. If the third three-way valve 43 is set at the high temperature radiator flow path 4b side, the cooling water flowing out from the cooling water piping 22b of the condenser 22 flows through the high temperature radiator flow path 4b. On the other hand, if the third three-way valve 43 is set at the heater flow path 4c side, the cooling water flowing out from the cooling water piping 22b of the condenser 22 flows through the electric heater 44 and heater core 45. Note that, if possible to suitably adjust the flow rate of cooling water flowing into the high temperature radiator flow path 4b and heater flow path 4c, an adjusting valve or on-off valve or other control device may be used instead of the third three-way valve 43.

The electric heater 44 functions as a heater heating the cooling water. The electric heater 44 is, for example, provided with a resistance heating element placed around the piping through which the cooling water flows, and is configured so that the cooling water in the piping is heated by supplying electric power to this resistance heating element. The electric heater 44 is, for example, used for heating, when the temperature of the outside air is extremely low and as a result the refrigerant does not suitably function in the refrigeration circuit 2.

The heater core 45 is configured to exchange heat between the cooling water circulating through the high temperature circuit 4 and the air surrounding the heater core 45 to thereby heat the passenger compartment. Specifically, the heater core 45 is configured so as to discharge heat from the cooling water to the air surrounding the heater core 45. Therefore, if high temperature cooling water flows to the heater core 45, the temperature of the cooling water is decreased and the air surrounding the heater core 45 is warmed.

FIG. 2 is a view of the configuration schematically showing the air passage 6 for air-conditioning the vehicle 100 mounting the vehicle-mounted temperature controller 1. In the air passage 6, air flows in the direction shown by the arrow marks in the figure. The air passage 6 shown in FIG. 2 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 2 is connected to air vent openings blowing air into the passenger compartment. Air is supplied from the air passage 6 to any of the air vent openings according to the state of control by the control device 5.

As shown in FIG. 2, at the air passage 6 for air-conditioning of the present embodiment, a blower 61, evaporator 26, air mix door 62, and heater core 45 are provided in that order in the direction of flow of the air.

The blower 61 is provided with a blower motor 61a and a blower fan 61b. The blower 61 is configured so that if the blower fan 61b is driven by the blower motor 61a, the outside air or the air inside the passenger compartment flows into the air passage 6 and the air flows through the air passage 6.

The air mix door 62 adjusts the flow rate of the air flowing through the heater core 45 in the air flowing through the air passage 6. The air mix door 62 is configured to be able to be adjusted among the state where all of the air flowing through the air passage 6 flows through the heater core 45, the state where none of the air flowing through the air passage 6 flows through the heater core 45, and states between them.

In the thus configured air passage 6, when the blower 61 is driven, if the refrigerant circulates through the evaporator 26, the air flowing through the air passage 6 is cooled. Further, when the blower 61 is driven, if the cooling water circulates to the heater core 45 and the air mix door 62 is controlled so that air flows through the heater core 45, the air flowing through the air passage 6 is warmed.

FIG. 3 is a view schematically showing the vehicle 100 mounting the vehicle-mounted temperature controller 1. As shown in FIG. 3, at the inside of the front grille of the vehicle 100, a low temperature radiator 32 and high temperature radiator 42 are arranged. Therefore, when the vehicle 100 is running, wind generated based on movement of vehicle strikes these radiators 32 and 42. Further, a fan 71 is provided adjacent to these radiators 32 and 42. The fan 71 is configured so that if driven, the air strikes the radiators 32 and 42. Therefore, even when the vehicle 100 is not running, by driving the fan 71, it is possible to make air strike the radiators 32 and 42.

Referring to FIG. 1, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of the battery, a first water temperature sensor 53 detecting the temperature of the cooling water flowing out from the cooling water piping 27b of the chiller 27, and a second water temperature sensor 54 detecting the temperature of the cooling water flowing into the heater core 45. The ECU 51 is connected to these sensors, and output signals from these sensors are input to the ECU 51.

In addition, the ECU 51 is connected to various types of actuators of the vehicle-mounted temperature controller 1 and controls these actuators. Specifically, the ECU 51 is connected to the compressor 21, the solenoid regulating valves 28 and 29, the pumps 31 and 41, the three-way valves 33, 34, and 43, the electric heater 44, the blower motor 61a, the air mix door 62, and the fan 71 and controls the same.

Operation of Vehicle-Mounted Temperature Controller

Next, referring to FIGS. 4 to 10, typical operating states of the vehicle-mounted temperature controller 1 will be explained. In FIGS. 4 to 10, a flow path through which the refrigerant or the cooling water flows is shown by a solid line, while a flow path through which the refrigerant or cooling water does not flow is shown by a broken line. Further, thick arrow marks in the figures show directions of movement of heat.

Figure 4:
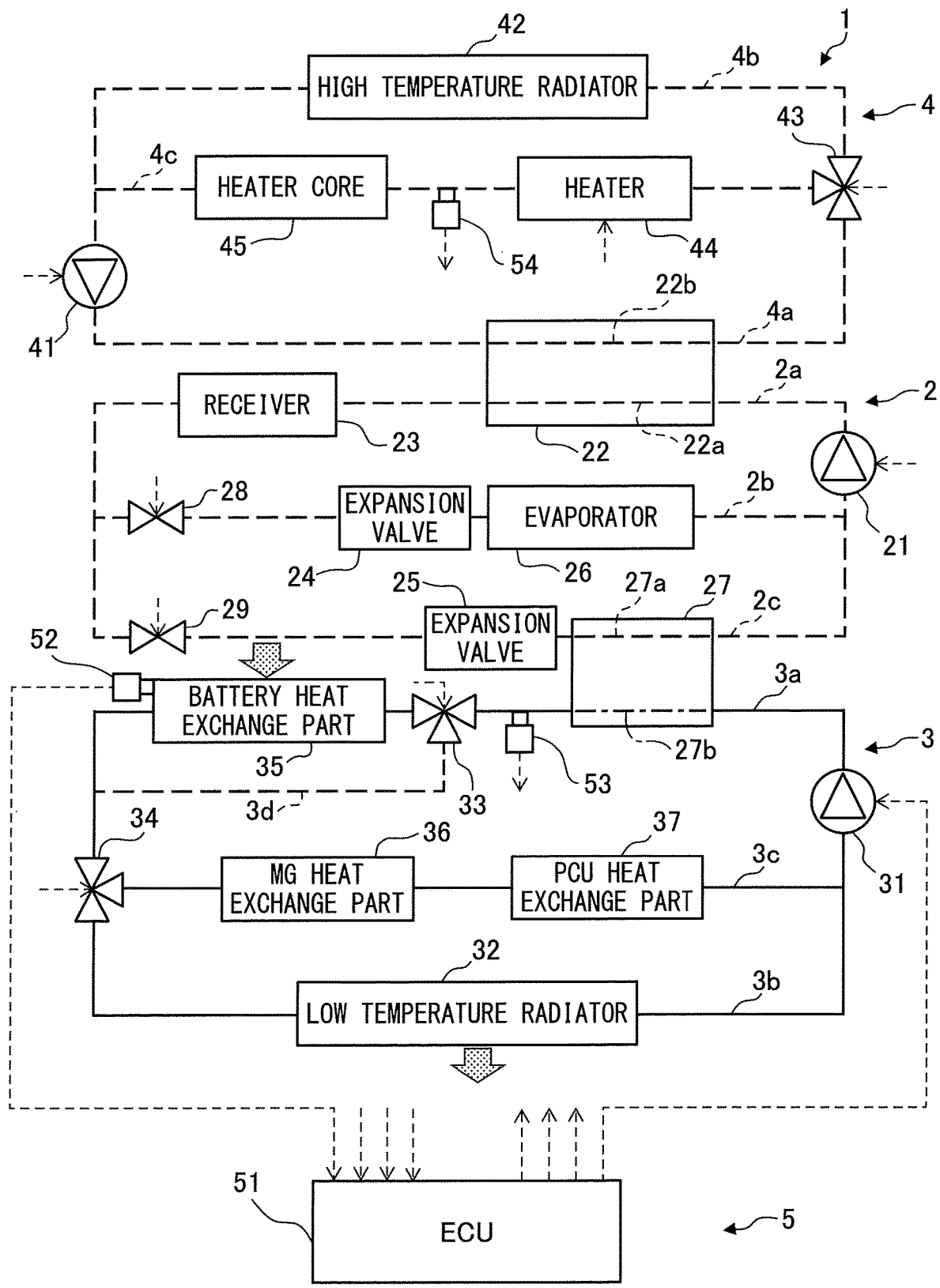
FIG. 4 shows an operating state when the vehicle-mounted temperature controller is operating in a first stopping mode.

FIG. 4 shows the operating state in the case where the vehicle-mounted temperature controller 1 is operating in the first stopping mode when the passenger compartment is neither being cooled nor heated and the battery is a certain degree of high temperature and has to be cooled.

As shown in FIG. 4, in the first stopping mode, the compressor 21 and the second pump 41 are stopped from operating. Therefore, in the refrigeration circuit 2, no refrigerant circulates. Further, in the high temperature circuit 4, no cooling water circulates. On the other hand, in the first stopping mode, the first pump 31 is driven. Therefore, inside the low temperature circuit 3, cooling water circulates.

Further, in the first stopping mode, the first three-way valve 33 is set so that cooling water circulates through the battery heat exchange part 35. Further, in the example shown in FIG. 4, the second three-way valve 34 is set so that the cooling water flows to both of the low temperature radiator flow path 3b and high temperature equipment flow path 3c. However, the second three-way valve 34 may also be set so that the cooling water flows to only the low temperature radiator flow path 3b.

As a result, in the first stopping mode, in the battery heat exchange part 35, the heat of the battery is transferred to the cooling water. For this reason, the battery is cooled and the temperature of the cooling water rises to equal to or greater than the temperature of the outside air. After that, the cooling water is cooled at the low temperature radiator 32 by heat exchange with the outside air, and again flows into the battery heat exchange part 35. Therefore, in the first stopping mode, heat is absorbed from the battery at the battery heat exchange part and that heat is discharged at the low temperature radiator 32.

Figure 5:
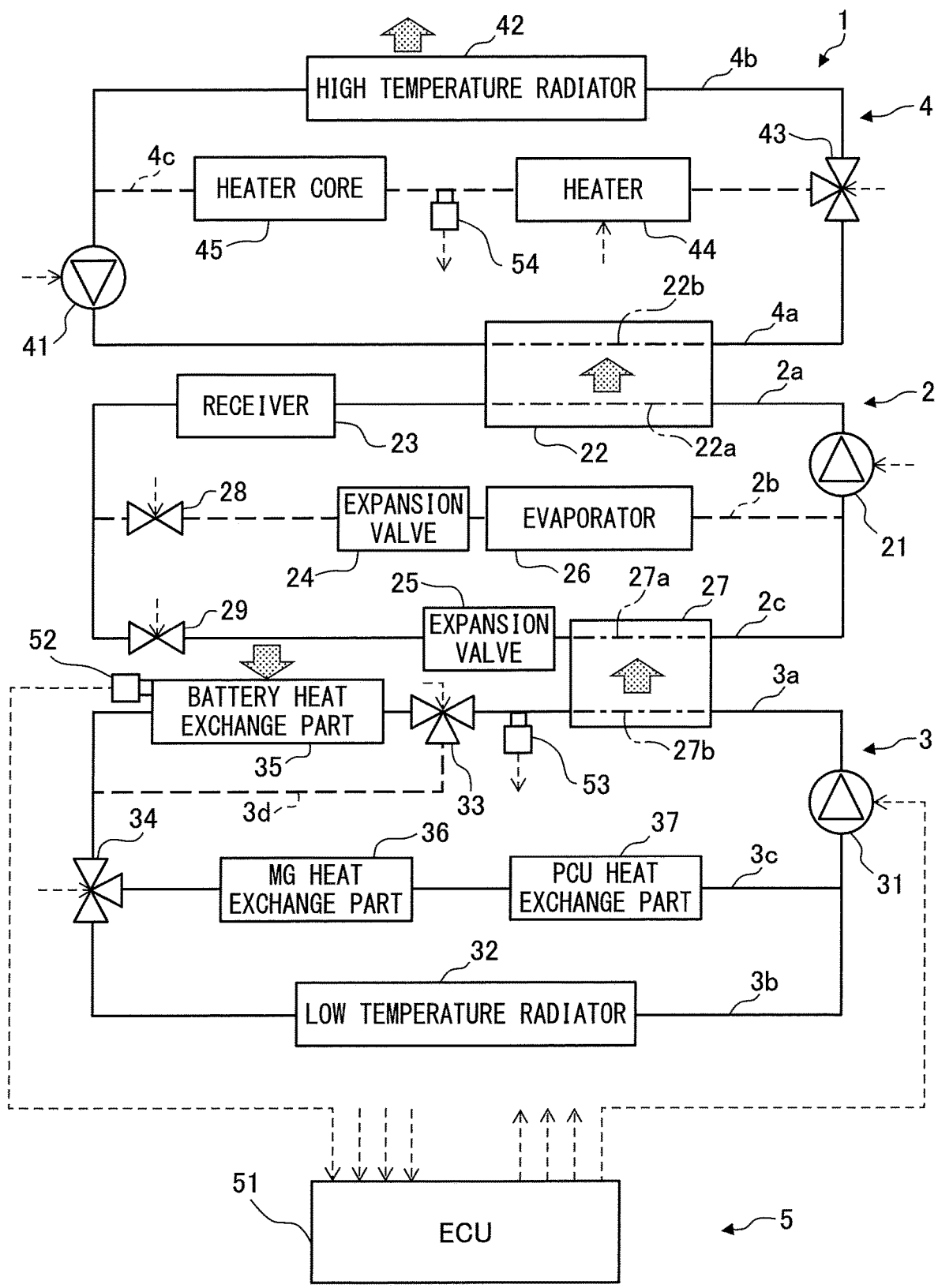
FIG. 5 shows an operating state when the vehicle-mounted temperature controller is operating in a second stopping mode.

FIG. 5 shows the operating state in the case where the vehicle-mounted temperature controller 1 is operating in the second stopping mode, when the passenger compartment is neither being cooled nor heated and the battery is an extremely high temperature and has to be cooled.

As shown in FIG. 5, in the second stopping mode, all of the compressor 21, the first pump 31, and the second pump 41 are operated. Therefore, the refrigerant or cooling water circulates through all of the refrigeration circuit 2, low temperature circuit 3, and high temperature circuit 4.

Further, in the second stopping mode, the first solenoid regulating valve 28 is closed and the second solenoid regulating valve 29 is opened. Therefore, the refrigerant does not circulate through the evaporator 26, but the refrigerant is circulated through the chiller 27. In addition, in the second stopping mode, the first three-way valve 33 is set so that cooling water circulates to the battery heat exchange part 35. Further, in the example shown in FIG. 5, the second three-way valve 34 is set so that the cooling water flows to both of the low temperature radiator flow path 3b and high temperature equipment flow path 3c. Due to this, the cooling water flows to the MG heat exchange part 36 and PCU heat exchange part 37 as well, therefore the MG or PCU can be cooled. However, the second three-way valve 34 may also be set so that the cooling water flows to only the low temperature radiator flow path 3b. Further, in the second stopping mode, the third three-way valve 43 is set so that cooling water circulates through the high temperature radiator flow path 4b.

As a result, in the second stopping mode, at the chiller 27, the heat of the cooling water in the low temperature circuit 3 is transferred to the refrigerant, and this cooling water is cooled. After that, this low temperature cooling water flows to the battery heat exchange part 35 and the battery is cooled. On the other hand, the heat of the refrigerant is transferred to the high temperature circuit 4 at the condenser 22, and the cooling water in the high temperature circuit 4 is warmed. After that, this high temperature cooling water is cooled at the high temperature radiator 42 by heat exchange with the outside air, and again flows to the condenser 22. Therefore, in the second stopping mode, heat is absorbed from the battery at the battery heat exchange part 35 and that heat is discharged at the high temperature radiator 42.

Figure 6:
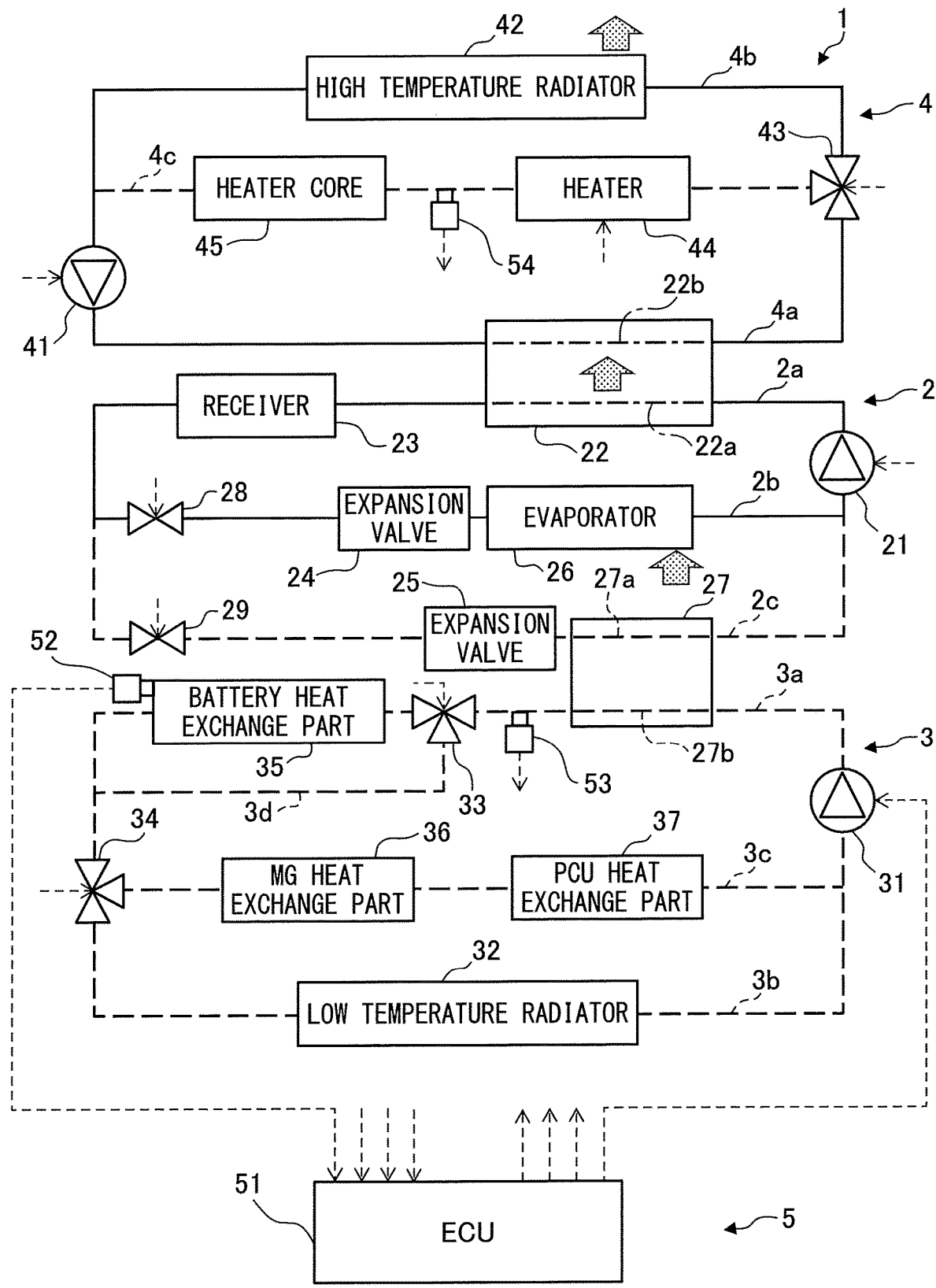
FIG. 6 shows an operating state when the vehicle-mounted temperature controller is operating in a first cooling mode.

FIG. 6 shows the operating state if the vehicle-mounted temperature controller 1 is operating in the first cooling mode, when the passenger compartment is being cooled and the temperature of the battery is not that high.

As shown in FIG. 6, at the first cooling mode, the compressor 21 and the second pump 41 are driven. Therefore, the refrigerant circulates in the refrigeration circuit 2, and cooling water circulates in the high temperature circuit 4. On the other hand, in the first cooling mode, the operation of the first pump 31 is stopped, and accordingly no cooling water circulates in the low temperature circuit 3.

Further, in the first cooling mode, the first solenoid regulating valve 28 is opened, and the second solenoid regulating valve 29 is closed. Therefore, the refrigerant circulates to the evaporator 26, but the refrigerant does not circulate to the chiller 27. Further, in the first cooling mode, the third three-way valve 43 is set so that the cooling water circulates through the high temperature radiator flow path 4b.

As a result, at the first cooling mode, the heat of the surrounding air is transferred by the evaporator 26 to the refrigerant, whereby the surrounding air is cooled. On the other hand, the heat of the refrigerant is transferred by the condenser 22 to the high temperature circuit 4, whereby the cooling water in the high temperature circuit 4 is warmed. After that, this high temperature cooling water is cooled at the high temperature radiator 42 by heat exchange with the outside air, and again flows into the condenser 22. Therefore, in the first cooling mode, heat is absorbed from the surrounding air at the evaporator 26, and that heat is discharged at the high temperature radiator 42.

Figure 7:
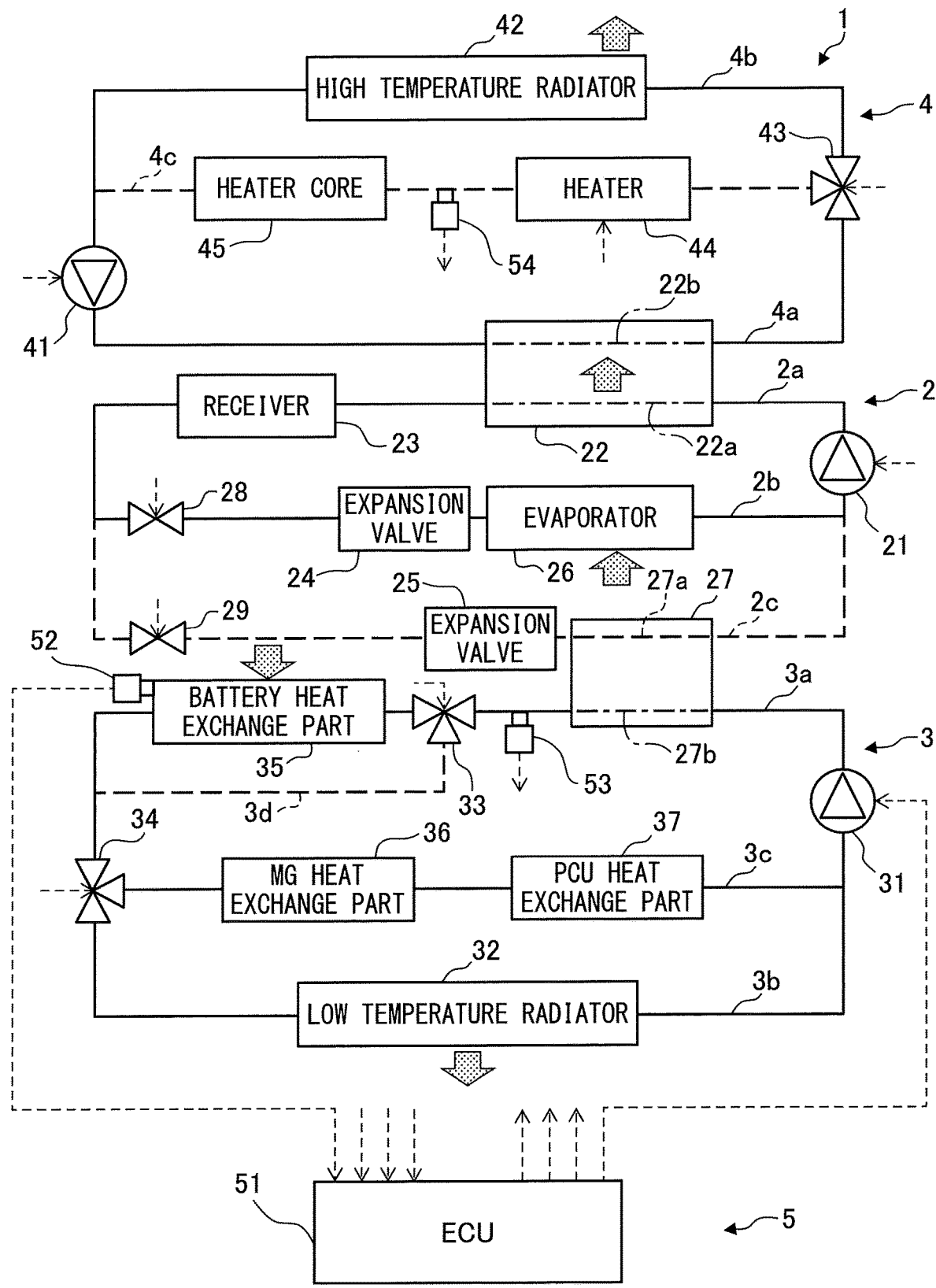
FIG. 7 shows an operating state when the vehicle-mounted temperature controller is operating in a second cooling mode.

FIG. 7 shows the operating state if the vehicle-mounted temperature controller 1 operates in the second cooling mode, when the passenger compartment is being cooled and the battery is high in temperature to a certain extent, and has to be cooled.

As shown in FIG. 7, in the second cooling mode, all of the compressor 21, the first pump 31, and the second pump 41 are operated. Further, in the second cooling mode, the first solenoid regulating valve 28 is opened, the second solenoid regulating valve 29 is closed, and the third three-way valve 43 is set so that cooling water circulates through the high temperature radiator flow path 4b. Further, in the example shown in FIG. 5, the second three-way valve 34 is set so that the cooling water flows to both of the low temperature radiator flow path 3b and high temperature equipment flow path 3c. However, the second three-way valve 34 may also be set so that cooling water flows to only the low temperature radiator flow path 3b.

As a result, in the second cooling mode, in the refrigeration circuit 2 and high temperature circuit 4, transfer of heat similar to the first cooling mode shown in FIG. 6 occurs. Further, in the second cooling mode, at the battery heat exchange part 35, the heat of the battery is transferred to the cooling water. After that, the cooling water is cooled at the low temperature radiator 32 by heat exchange with the outside air, and again flows into the battery heat exchange part 35. Therefore, in the second cooling mode, the heat is absorbed from the surrounding air at the evaporator 26 and that heat is discharged at the high temperature radiator 42, while heat is absorbed at the battery heat exchange part 35 from the battery, and that heat is discharged at the low temperature radiator 32.

Figure 8:
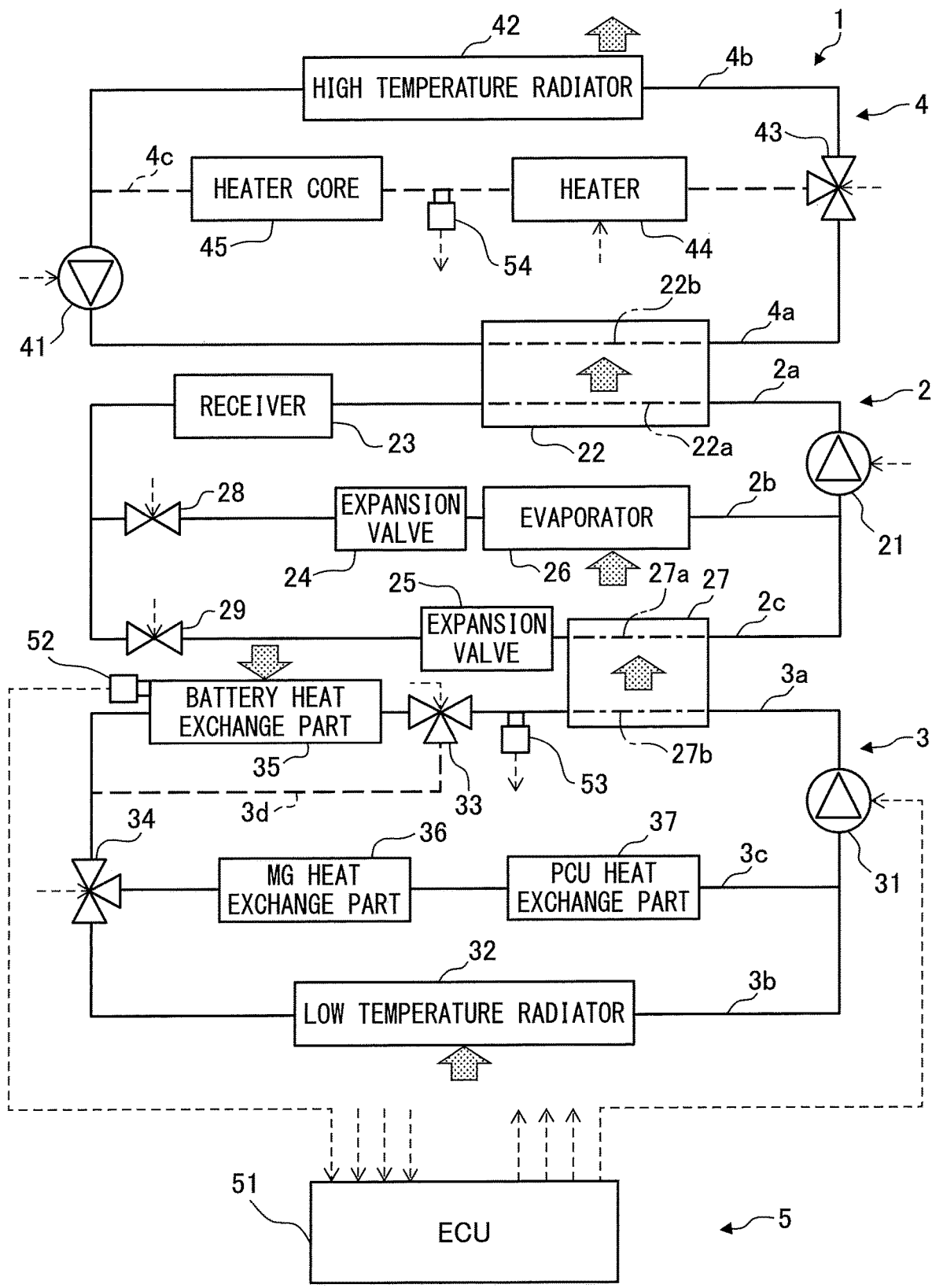
FIG. 8 shows an operating state when the vehicle-mounted temperature controller is operating in a third cooling mode.

FIG. 8 shows the operating state if the vehicle-mounted temperature controller 1 operates in the third cooling mode, when the passenger compartment is being cooled and the battery is extremely high temperature and has to be cooled.

As shown in FIG. 8, in the third cooling mode, all of the compressor 21, the first pump 31, and the second pump 41 are operated. Further, in the third cooling mode, both of the first solenoid regulating valve 28 and the second solenoid regulating valve 29 are opened, and refrigerant circulates to both of the evaporator 26 and the chiller 27. The opening degrees of the solenoid regulating valves 28 and 29 at this time are adjusted in accordance with the cooling strength and the temperature of the battery, etc. In addition, in the third cooling mode, the first three-way valve 33 is set so that the cooling water circulates through the battery heat exchange part 35. Further, in the example shown in FIG. 8, the second three-way valve 34 is set so that the cooling water flows to both the low temperature radiator flow path 3b and high temperature equipment flow path 3c. However, the second three-way valve 34 may also be set so that the cooling water flows to only the low temperature radiator flow path 3b. Furthermore, in the third cooling mode, the third three-way valve 43 is set so that the cooling water circulates through the high temperature radiator flow path 4b.

As a result, in the third cooling mode, the heat of the cooling water in the low temperature circuit 3 is transferred to the refrigerant at the chiller 27 where this cooling water is cooled. After that, this low temperature cooling water flows to the battery heat exchange part 35 where the battery is cooled. Further, in the third cooling mode, the heat of the surrounding air is transferred to the refrigerant at the evaporator 26 where the surrounding air is cooled. On the other hand, the heat of the refrigerant is transferred to the high temperature circuit 4 at the condenser 22 where the cooling water in the high temperature circuit 4 is warmed. After that, this high temperature cooling water is cooled at the high temperature radiator 42 by heat exchange with the outside air, and again flows into the condenser 22. Therefore, in the third cooling mode, heat is absorbed from the battery at the battery heat exchange part 35, heat is absorbed from the surrounding air at the evaporator 26, and that heat is discharged at the high temperature radiator 42.

Note that, if performing dehumidification in addition to cooling in the first cooling mode, the second cooling mode, and the third cooling mode, the third three-way valve 43 is set so that the cooling water also circulates through the heater core 45 in addition to the high temperature radiator flow path 4b. Due to this, the air flowing through the air passage 6 is cooled by the evaporator 26, then is heated by the heater core 45 whereby the air is reduced in humidity.

Figure 9:
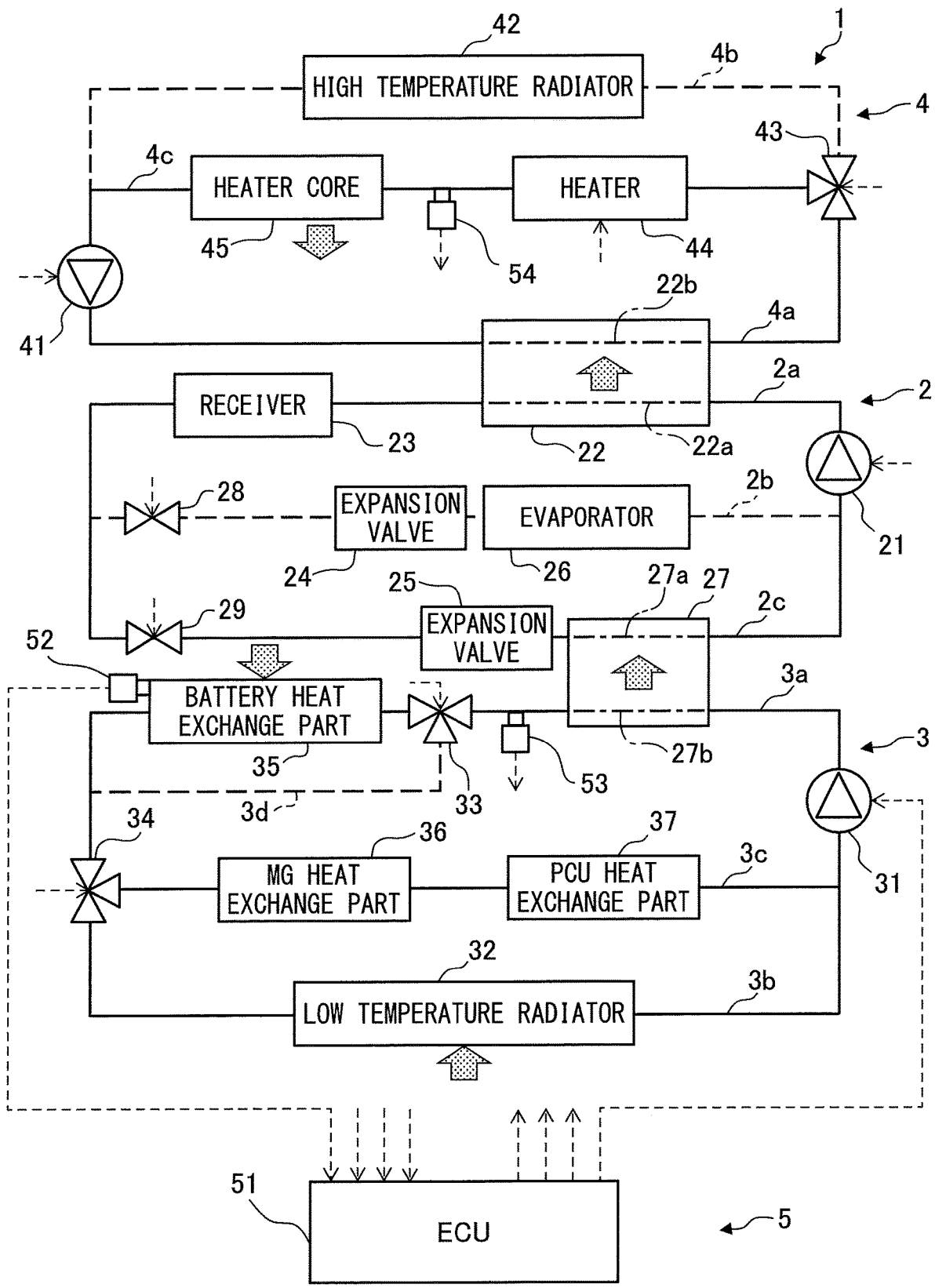
FIG. 9 shows an operating state when the vehicle-mounted temperature controller is operating in a heating mode.
Figure 10:
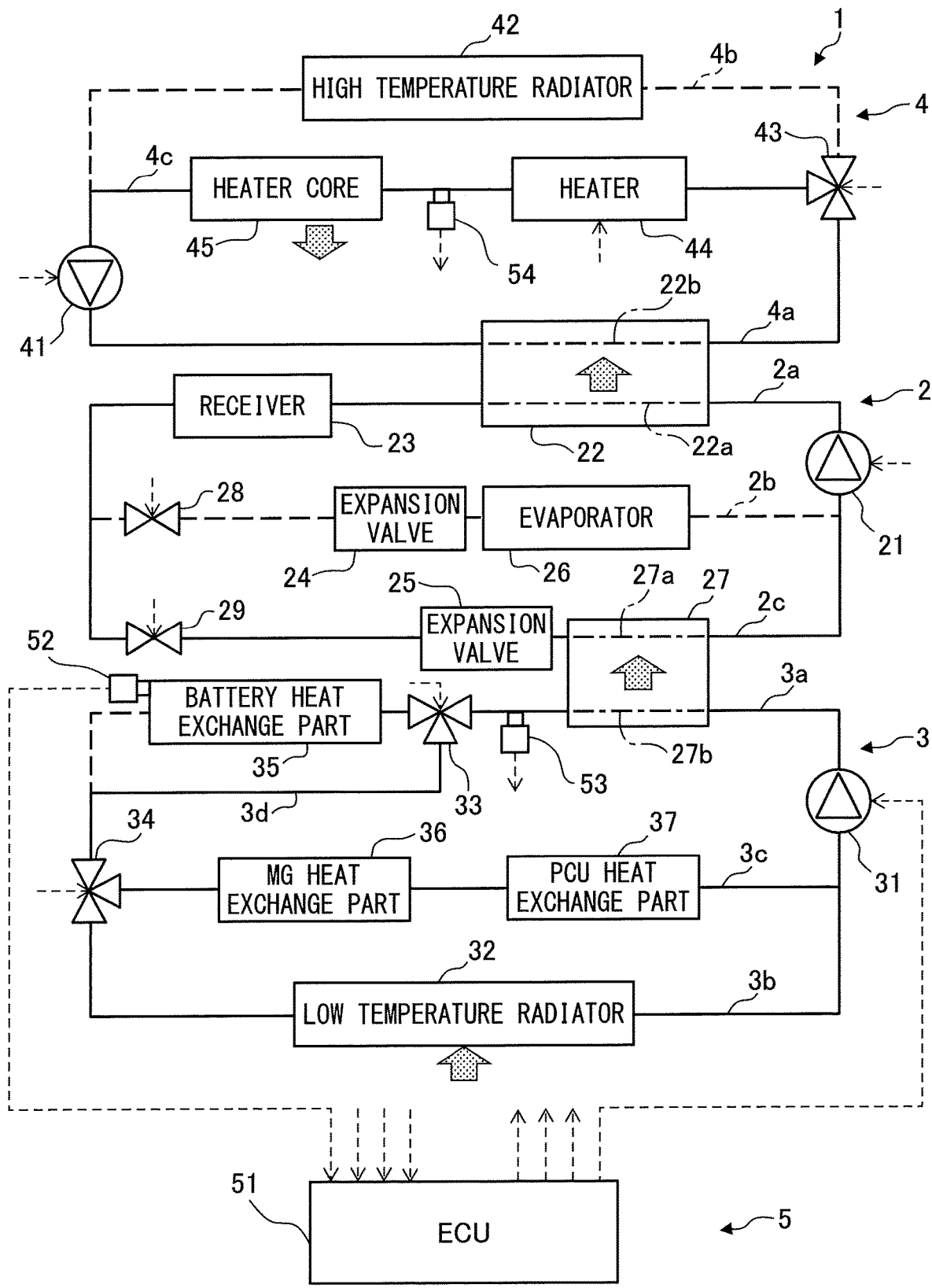
FIG. 10 shows an operating state when the vehicle-mounted temperature controller is operating in the heating mode.

FIGS. 9 and 10 show the operating state in the case if the vehicle-mounted temperature controller 1 is operating in the heating mode, when the passenger compartment is being heated and the battery is equal to or greater than the normal operating temperature. In particular, FIG. 9 shows the case where the first three-way valve 33 is set so that cooling water circulates through the battery heat exchange part 35, while FIG. 10 shows the case where the first three-way valve 33 is set so that cooling water circulates through the bypass flow path 3d.

As shown in FIGS. 9 and 10, in the heating mode, all of the compressor 21, the first pump 31, and the second pump 41 are operated. Therefore, the refrigerant or cooling water circulates through all of the refrigeration circuit 2, the low temperature circuit 3, and the high temperature circuit 4.

Further, in the heating mode, the first solenoid regulating valve 28 is closed, and the second solenoid regulating valve 29 is opened. Therefore, the refrigerant does not circulate through the evaporator 26, while the refrigerant circulates through the chiller 27. Further, in the example shown in FIGS. 9 and 10, the second three-way valve 34 is set so that cooling water flows to both of the low temperature radiator flow path 3b and high temperature equipment flow path 3c. However, the second three-way valve 34 may also be set so that cooling water flows to only the low temperature radiator flow path 3b. Furthermore, in the heating mode, the third three-way valve 43 is set so that the cooling water circulates through the heater flow path 4c.

As a result, in the heating mode, the heat of the cooling water in the low temperature circuit 3 is transferred at the chiller 27 to the refrigerant, whereby this cooling water is cooled. As shown in FIG. 9, if the first three-way valve 33 is set so that cooling circulates through the battery heat exchange part 35, this low temperature cooling water flows to the battery heat exchange part 35 and low temperature radiator 32, and the heat is absorbed by the cooling water from the battery and the outside air. On the other hand, if the first three-way valve 33 is set so that the cooling water circulates through the bypass flow path 3d as shown in FIG. 10, this low temperature cooling water flows to the low temperature radiator 32, and the heat is absorbed by the cooling water from the outside air.

Further, the heat of the refrigerant is transferred to the high temperature circuit 4 at the condenser 22, and the cooling water in the high temperature circuit 4 is warmed. After that, this high temperature cooling water is cooled at the heater core 45 by heat exchange with the surrounding air. Along with this, the surrounding air is raised in temperature. Therefore, in the heating mode, heat is absorbed at the low temperature radiator 32 from the outside air and, in some cases, heat is absorbed at the battery heat exchange part 35 from the battery, and that heat is discharged at the heater core 45.

Note that, in the heating mode, if performing dehumidification in addition to heating, the first solenoid regulating valve 28 is opened and the refrigerant is circulated through the evaporator 26 as well. Due to this, the air flowing through the air passage 6 is cooled at the evaporator 26, then is heated at the heater core 45 and the humidity of air is decreased.

Control of Vehicle-Mounted Temperature Controller

Figure 11:
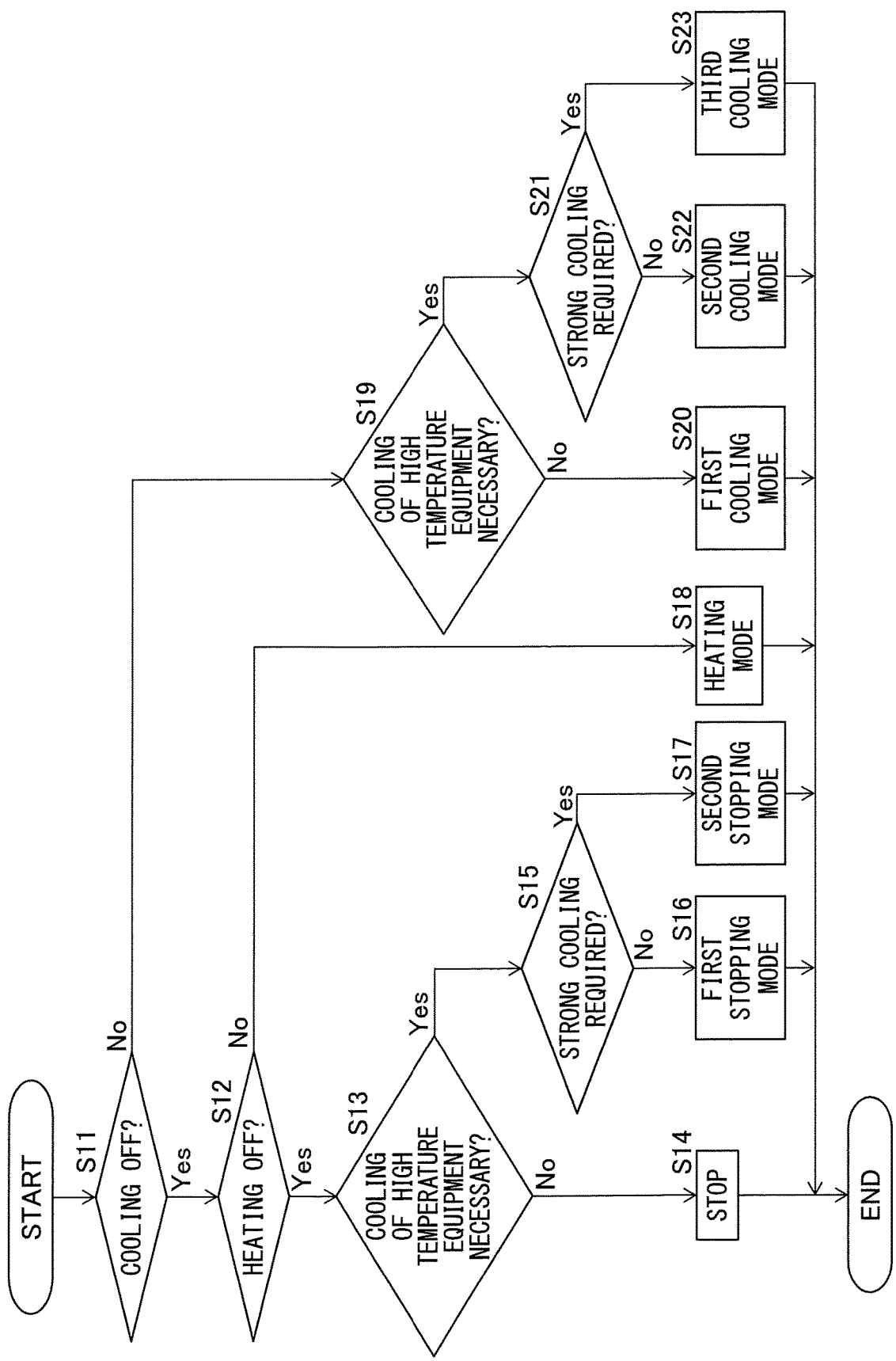
FIG. 11 is a flow chart showing a control routine of the vehicle-mounted temperature controller.

Next, referring to FIGS. 11 and 12, control of the vehicle-mounted temperature controller 1 will be explained. FIG. 11 is a flow chart showing a control routine of the vehicle-mounted temperature controller 1. The illustrated control routine is performed every constant time interval.

First, at step S11, it is determined if the cooling mode of the vehicle 100 is OFF. The ON/OFF state of the cooling mode of the vehicle 100 is, for example, automatically switched based on the temperature setting of the user or the temperature in the passenger compartment, etc. If, at step S11, it is determined that the cooling mode is OFF, the routine proceeds to step S12.

At step S12, it is determined if the heating mode of the vehicle 100 has been OFF. The ON/OFF state of the cooling mode of the vehicle 100 is also, for example, automatically switched based on the temperature setting of the user or the temperature in the passenger compartment, etc. If, at step S12, it is determined that the heating mode is OFF, the routine proceeds to step S13.

At step S13, it is determined if the high temperature equipment has to be cooled. Here, the "high temperature equipment" means equipment which has to be cooled using the vehicle-mounted temperature controller 1, and specifically may include the battery, MG, PCU, etc. If, at step S13, it is determined that the high temperature equipment does not have to be cooled, the routine proceeds to step S14. At step S14, the vehicle-mounted temperature controller 1 is stopped operating. Therefore, all of the compressor 21, the first pump 31, and the second pump 41 are stopped.

On the other hand, if, at step S13, it is determined that the high temperature equipment has to be cooled, the routine proceeds to step S15. At step S15, it is determined if the high temperature equipment has to be strongly cooled by using the chiller 27 of the refrigeration circuit 2. If, at step S15, it is determined that strong cooling is not required, the routine proceeds to step S16 where the vehicle-mounted temperature controller 1 is operated in the first stopping mode explained using FIG. 4. On the other hand, if, at step S15, it is determined that strong cooling is required, the routine proceeds to step S17 where the vehicle-mounted temperature controller 1 is operated in the second stopping mode explained using FIG. 5.

If, at step S12, it is determined that the heating mode of the vehicle 100 is ON, the routine proceeds to step S18. At step S18, the vehicle-mounted temperature controller 1 is operated in the heating mode explained using FIGS. 9 and 10.

If, at step S11, it is determined that the cooling mode of the vehicle 100 is ON, the routine proceeds to step S19. At step S19, in the same way as step S13, it is determined if the high temperature equipment has to be cooled. If, at step S19, it is determined that the high temperature equipment does not have to be cooled, the routine proceeds to step S20. At step S20, the vehicle-mounted temperature controller 1 is operated in the first cooling mode explained using FIG. 6.

On the other hand, if, at step S19, it is determined that the high temperature equipment has to be cooled, the routine proceeds to step S21. At step S21, in the same way as step S15, it is determined if strong cooling is necessary. If, at step S21, it is determined that strong cooling is not necessary, the routine proceeds to step S22 where the vehicle-mounted temperature controller 1 is operated in the second cooling mode explained using FIG. 7. On the other hand, if, at step S21, it is determined that strong cooling is necessary, the routine proceeds to step S23 where the vehicle-mounted temperature controller 1 is operated in the third cooling mode explained using FIG. 8.

Figure 12:
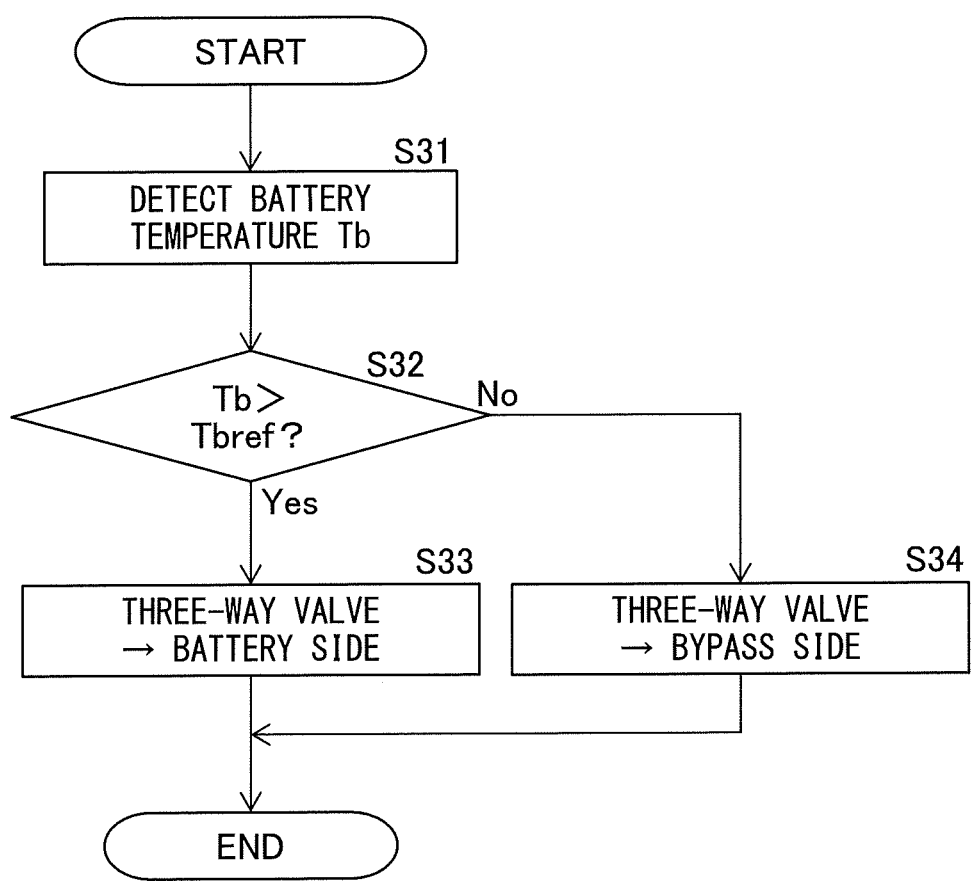
FIG. 12 is a flow chart showing a control routine of switching of a first three-way valve.

FIG. 12 is a flow chart showing a control routine of switching of the first three-way valve 33. The illustrated control routine is performed every constant time interval.

First, at step S31, the temperature Tb of the battery is detected. The temperature Tb of the battery is, for example, detected by the battery temperature sensor 52. Next, at step S32, it is determined if the temperature Tb of the battery is higher than the reference temperature Tbref. Here, the "reference temperature Tbref" is for example the temperature most suitable for operation of the battery or a temperature near the same. Specifically, the reference temperature Tbref is 10° C. to 30° C., preferably 20° C.

If, at step S32, it is determined that the temperature Tb of the battery is higher than the reference temperature Tbref, the routine proceeds to step S33. At step S33, the first three-way valve 33 is set so that all of the cooling water circulates through the battery heat exchange part 35. On the other hand, if, at step S32, it is determined if the temperature Tb of the battery is equal to or less than the reference temperature Tbref, the routine proceeds to step S34. At step S34, the first three-way valve 33 is set so that all of the cooling water circulates through the bypass flow path 3d.

Actions and Effects

Figure 13:
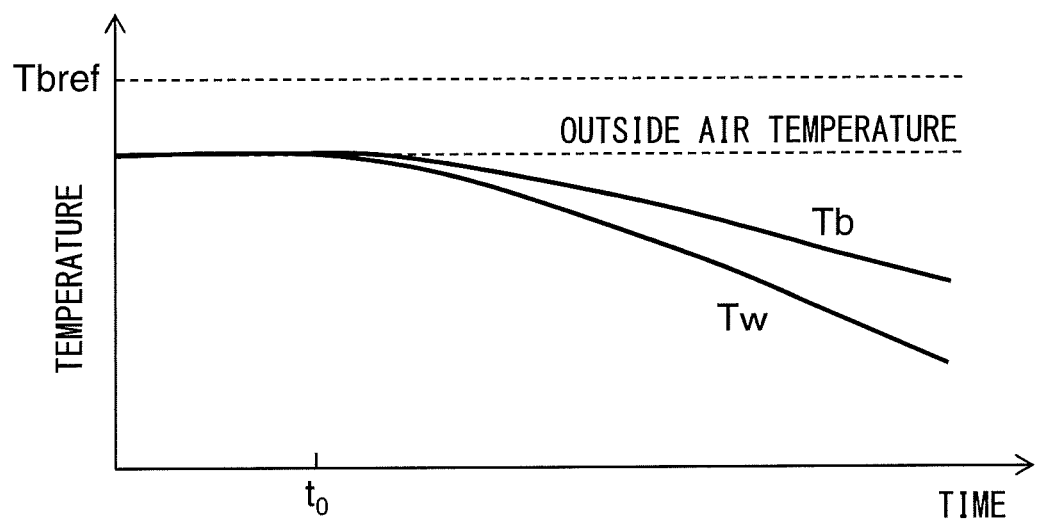
FIG. 13 is a view showing trends in a temperature of a battery and a temperature of cooling water of a low temperature circuit, when the vehicle-mounted temperature controller is operating in the heating mode.
Figure 14:
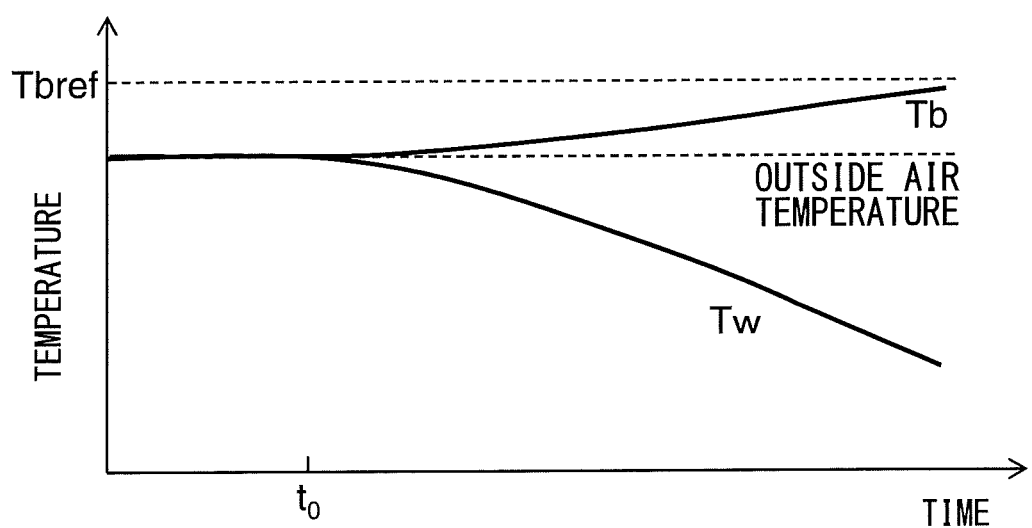
FIG. 14 is a view showing trends in the temperature of the battery and the temperature of cooling water of the low temperature circuit when the vehicle-mounted temperature controller is operating in the heating mode.

Next, referring to FIGS. 13 and 14, the action and effects of the vehicle-mounted temperature controller 1 according to the present embodiment will be explained. FIGS. 13 and 14 respectively show the trends in the temperature Tb of the battery and the temperature Tw of the cooling water of the low temperature circuit 3 when the heating mode is started at the time $t_0$ at the vehicle-mounted temperature controller 1.

FIG. 13 shows the trend in the temperature in the case where no bypass flow path 3d is provided. As explained above, in the heating mode, the heat discharged from the heater core 45 is robbed from the cooling water of the low temperature circuit 3. For this reason, the temperature of the cooling water of the low temperature circuit 3 gradually decreases. If at this time no bypass flow path 3d is provided, all of the cooling water of the low temperature circuit 3 circulates through the battery heat exchange part 35. Therefore, the temperature Tb of the battery also gradually decreases and separates from the optimum operating temperature of the battery (that is, the vicinity of the reference temperature Tbref).

Here, the battery increases in internal resistance if the temperature decreases to equal to or less than a certain temperature, resulting in a drop in capacity or drop in output voltage or other drop in performance. Therefore, if no bypass flow path 3d is provided, a drop in performance of the battery occurs if the vehicle-mounted temperature controller 1 is operated in the heating mode.

As opposed to this, in the present embodiment, when the temperature Tb of the battery is equal to or less than the reference temperature Tbref, the first three-way valve 33 is set so that cooling water circulates to the bypass flow path 3d. For this reason, as shown in FIG. 14, even if the temperature of the cooling water of the low temperature circuit 3 decreases, the temperature of the battery will not decrease. In particular, in the example shown in FIG. 14, after the time $t_0$, the heat generated by the battery itself causes the temperature of the battery to gradually rise toward the reference temperature Tbref. Therefore, according to the present embodiment, the battery is kept from being cooled away from the optimum temperature, and accordingly the performance of the battery is kept from dropping.

Further, according to the vehicle-mounted temperature controller 1 according to the present embodiment, in addition to heating and cooling of the passenger compartment, the high temperature equipment is also cooled by one refrigeration circuit 2. Therefore, there is no need to provide separate refrigeration circuits 2 for air-conditioning use and for use for cooling the high temperature equipment, and therefore the manufacturing cost of the vehicle-mounted temperature controller 1 can be kept low.

Modifications

Note that, in the above embodiment, the first three-way valve 33 is switched between state where all of the cooling water flows to the bypass flow path 3d side and the state where all of the cooling water flows to the battery heat exchange part 35 side. However, between these two states, a state where the cooling water flows to both of the bypass flow path 3d and battery heat exchange part 35 may also be provided. In this case, for example, the first three-way valve 33 may also be controlled so that the rate of flow to the battery heat exchange part 35 side becomes greater in steps or continuously, as the temperature of the battery gradually rises near the reference temperature Tbref. In this case, for example, when the temperature Tb of the battery is equal to or less than the reference temperature Tbref, the first three-way valve 33 is set so that at least part of the cooling water circulates through the bypass flow path 3d. Further, when the temperature Tb of the battery is higher than the reference temperature Tbref, the first three-way valve 33 is set so that at least part of the cooling water circulates through the battery heat exchange part 35. Therefore, in the present embodiment, the first three-way valve 33 is controlled so that the ratio of flow of the first heat medium circulating through the bypass flow path 3d becomes greater, when the temperature Tb of the battery is relatively low, compared to when it is relatively high.

Further, in the present embodiment, a high temperature circuit 4 is provided, but the condenser 22 may also be configured so as to directly heat the air in the air passage 6 (that is, so as to function as a heater core), instead of providing the high temperature circuit 4.

In addition, in the present embodiment, when the vehicle-mounted temperature controller 1 is operating in the heating mode, the first three-way valve 33 is controlled based on the temperature Tb of the battery. However, even when the vehicle-mounted temperature controller 1 is operating in a mode other than the heating mode, the first three-way valve 33 may be controlled based on the temperature Tb of the battery as shown in FIG. 12.

Second Embodiment

Next, referring to FIGS. 15 and 16, a vehicle-mounted temperature controller 1 according to a second embodiment will be explained. The configuration and control of the vehicle-mounted temperature controller 1 according to the second embodiment are basically the same as the configuration and control of the vehicle-mounted temperature controller according to the first embodiment. Therefore, below, the parts different from the first embodiment will be focused on in the explanation.

In this regard, in the above first embodiment, the first three-way valve 33 is switched based on whether the temperature Tb of the battery is equal to or less than the reference temperature Tbref. As opposed to this, in the vehicle-mounted temperature controller 1 according to the second embodiment, the first three-way valve 33 is switched based on the relationship between the temperature Tb of the battery and the temperature of the cooling water in the low temperature circuit 3.

Figure 15:
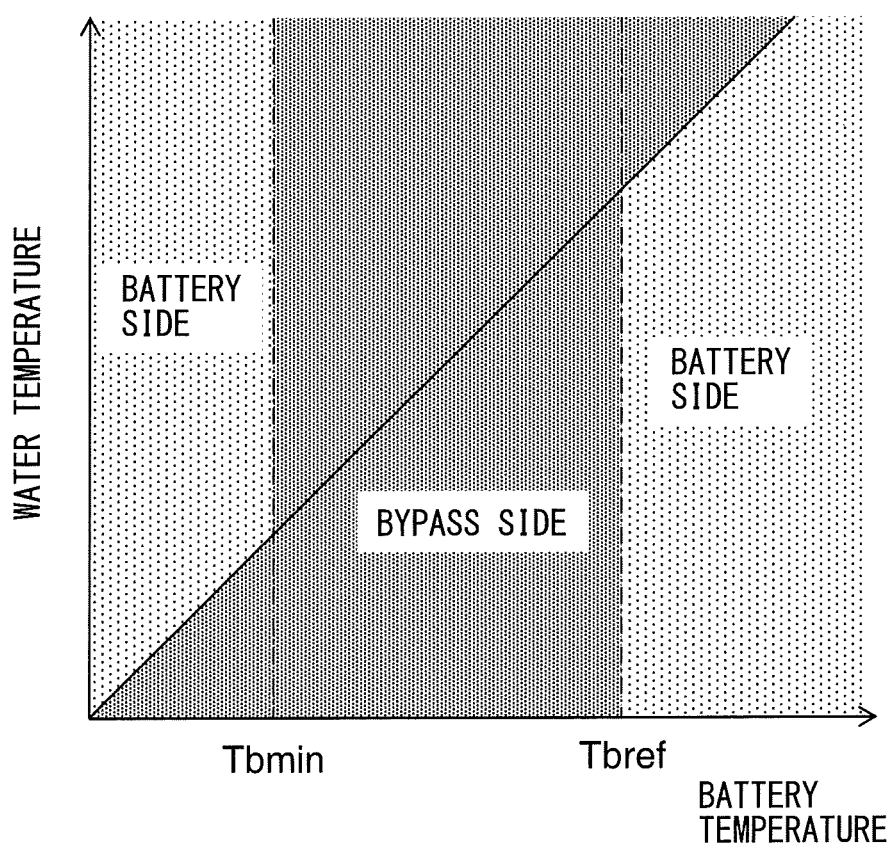
FIG. 15 is a view showing a relationship between the temperatures of the battery and the cooling water in the low temperature circuit and the settings of the first three-way valve.

FIG. 15 is a view showing the relationship between the temperature Tb of the battery and temperature Tw of the cooling water in the low temperature circuit 3 and the settings of the first three-way valve 33. As will be understood from FIG. 15, in the present embodiment, when the temperature Tb of the battery is equal to or greater than the lower limit temperature Tbmin and equal to or less than the reference temperature Tbref, the first three-way valve 33 is set so that all of the cooling water circulates through the bypass flow path 3d.

Further, if the temperature Tb of the battery is lower than the lower limit temperature Tbmin, when the temperature Tb of the battery is equal to or greater than the temperature Tw of the cooling water of the low temperature circuit 3, the first three-way valve 33 is set so that all of the cooling water circulates through the bypass flow path 3d. On the other hand, in this case, when the temperature Tb of the battery is lower than the temperature Tw of the cooling water of the low temperature circuit 3, the first three-way valve 33 is set so that all of the cooling water circulates through the battery heat exchange part 35.

Further, if the temperature Tb of the battery is higher than the reference temperature Tbref, when the temperature Tb of the battery is equal to or greater than the temperature Tw of the cooling water in the low temperature circuit 3, the first three-way valve 33 is set so that all of the cooling water circulates to the battery heat exchange part 35. On the other hand, in this case, when the temperature Tb of the battery is lower than the temperature Tw of the cooling water in the low temperature circuit 3, the first three-way valve 33 is set so that all of the cooling water circulates to the bypass flow path 3d.

Figure 16:
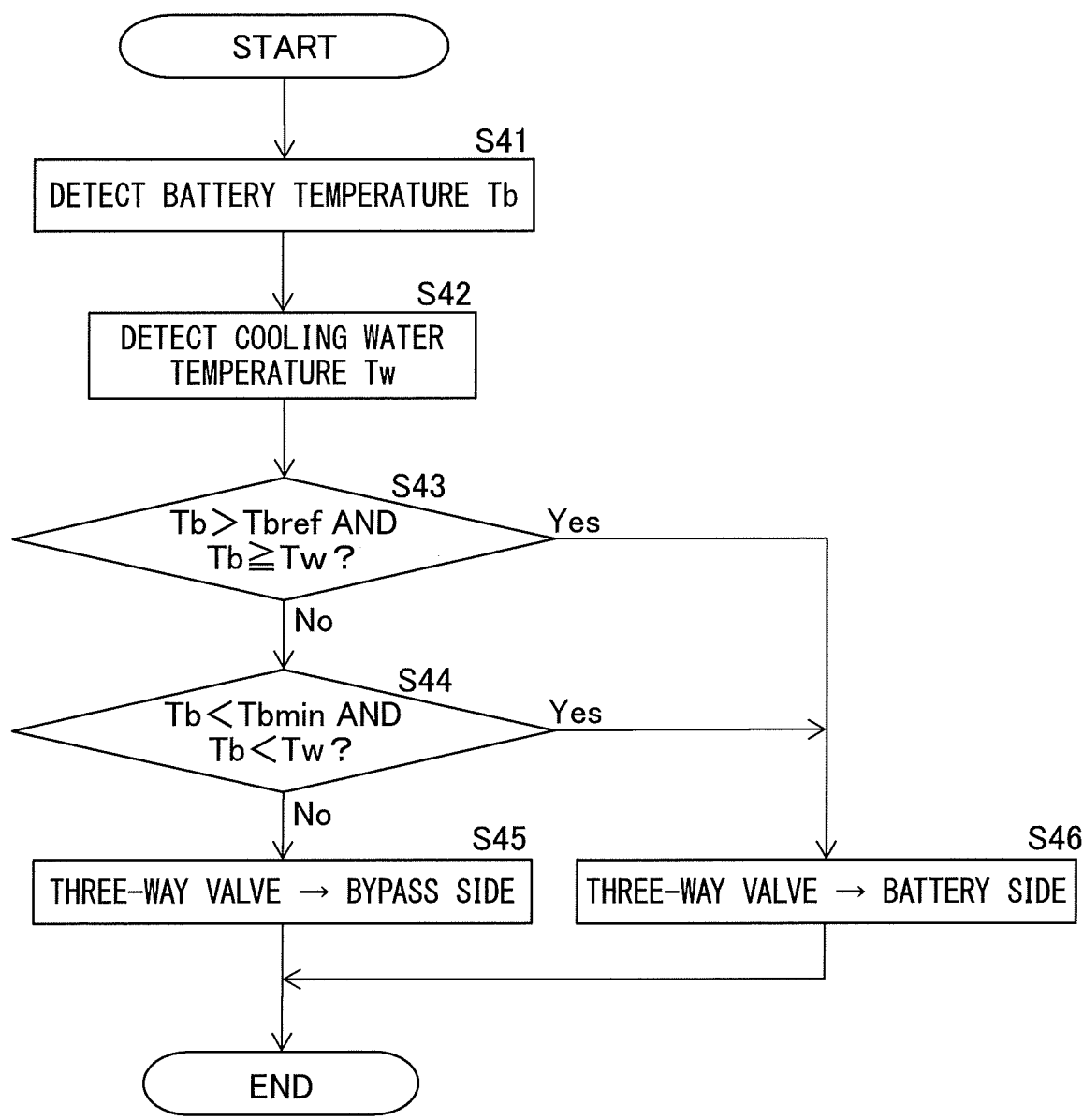
FIG. 16 is a flow chart showing a control routine of switching of the first three-way valve.

FIG. 16 is a flow chart showing a control routine of switching of the first three-way valve 33. The illustrated control routine is performed every constant time interval.

First, at step S41, in the same way as step S31 of FIG. 12, the temperature Tb of the battery is detected. Next, at step S42, the temperature Tw of the cooling water of the low temperature circuit 3 is detected. The temperature Tw of the cooling water of the low temperature circuit 3 is, for example, detected by the first water temperature sensor 53.

Next, at step S43, it is determined if the temperature Tb of the battery is higher than the reference temperature Tbref and or greater than the temperature Tw of the cooling water of the low temperature circuit 3. In addition, at step S44, it is determined if the temperature Tb of the battery is lower than the lower limit temperature Tbmin and lower than the temperature Tw of the cooling water of the low temperature circuit 3. If both of the condition of step S43 and the condition of step S44 are not satisfied, the routine proceeds to step S45. At step S45, the first three-way valve 33 is set so that cooling water circulates through the bypass flow path 3d. On the other hand, if either of the condition of step S43 and the condition of step S44 is satisfied, the routine proceeds to step S46. At step S46, the first three-way valve 33 is set so that cooling water circulates through the battery heat exchange part 35.

According to the present embodiment, if the temperature Tb of the battery is lower than the lower limit temperature Tbmin, when the temperature of the cooling water of the low temperature circuit 3 is higher than the temperature Tb of the battery, the cooling water is made to circulate to the battery heat exchange part 35. As a result, at the battery heat exchange part 35, heat is transferred from the cooling water to the battery, and accordingly the battery is warmed. Therefore, it is possible to keep the temperature of the battery from excessively decreasing.

Further, according to the present embodiment, if the temperature Tb of the battery is higher than the reference temperature Tbref, when the temperature of the cooling water of the low temperature circuit 3 is higher than the temperature Tb of the battery, cooling water is made to circulate to the bypass flow path 3d. As a result, cooling water does not flow to the battery heat exchange part 35 and, accordingly, heat is not transferred from the cooling water to the battery. For this reason, the battery is prevented from being raised in temperature so as to separate from the reference temperature (that is, near the optimum operating temperature) and the temperature of the battery can be maintained near the optimum operating temperature.

Note that, in the above second embodiment, the first three-way valve 33 is switched between a state where all of the cooling water flows to the bypass flow path 3d side and a state where all of the cooling water flows to the battery heat exchange part 35 side. However, between these two states, a state where cooling water flows to both of the bypass flow path 3d and battery heat exchange part 35 may also be provided. In this case, for example, the first three-way valve 33 may also be controlled so that the rate of flow to the battery heat exchange part 35 side becomes greater in steps or continuously as the temperature of the battery gradually rises near the reference temperature Tbref.

Above, preferred embodiments according to the present disclosure were explained, but the present disclosure is not limited to these embodiments and can be corrected and changed in various ways within the language of the claims.

The invention claimed is:
1. A vehicle-mounted temperature controller, comprising:
a first heat circuit having a battery heat exchange part exchanging heat with a battery and a chiller, and configured so that a first heat medium circulates therethrough; and
a refrigeration circuit having a compressor compressing a refrigerant to raise a temperature of the refrigerant, a condenser radiating heat from the refrigerant to other than the refrigerant and the first heat medium to make the refrigerant condense, an expansion valve making the refrigerant expand, and the chiller making the refrigerant absorb heat from the first heat medium to make the refrigerant evaporate, and configured to realize a refrigeration cycle by the refrigerant circulating therethrough, wherein the first heat circuit comprises a bypass flow path bypassing the battery heat exchange part and an adjusting valve adjusting a flow rate of the first heat medium flowing through the bypass flow path, and wherein an electronic control unit is configured to control the adjusting valve so that a ratio of a flow rate of the first heat medium flowing through the bypass flow path becomes greater, when a temperature of the battery is relatively low, compared to when the temperature of the battery is relatively high, and wherein the electronic control unit is configured to control the adjusting valve to make all of the first heat medium flow through the bypass flow path when the temperature of the battery is equal to or less than a predetermined reference temperature, and to make the first heat medium flow through the battery heat exchange part when the temperature of the battery is higher than the reference temperature.

2. The vehicle-mounted temperature controller according to claim 1, wherein the temperature controller further comprises a second heat circuit comprising a heater core heating an inside of a passenger compartment and configured so that a second heat medium circulates through the heater core, and the condenser exchanges heat between the refrigerant and the second heat medium so as to transfer heat from the refrigerant to the second heat medium.

3. The vehicle-mounted temperature controller according to claim 1, wherein the electronic control unit is configured to control the adjusting valve to make the first heat medium flow through the battery heat exchange part, if the temperature of the battery is lower than a lower limit temperature lower than the reference temperature, when the temperature of the battery is lower than the temperature of the first heat medium.

4. The vehicle-mounted temperature controller according to claim 1, wherein the electronic control unit is configured to control the adjusting valve to make the first heat medium flow through the bypass flow path, if the temperature of the battery is higher than the reference temperature, when the temperature of the battery is equal to or greater than the temperature of the first heat medium.

* * * * *